United States Patent [19]
Burlis et al.

[11] 3,752,617

[45] Aug. 14, 1973

[54] APPARATUS FOR EXTRUDING PRODUCTS OF PLURAL COMPONENTS OF VARIED PROPORTIONS WITH SCRAP RECLAMATION

[75] Inventors: Norbert W. Burlis, University City, Mo.; Joseph H. Corbett, Fort Edward, N.Y.

[73] Assignee: Sherwood Medical Industries Inc., St. Louis, Mo.

[22] Filed: Mar. 3, 1972

[21] Appl. No.: 231,608

Related U.S. Application Data
[63] Continuation of Ser. No. 865,615, Oct. 13, 1969, abandoned.

[52] U.S. Cl.................. 425/131, 425/145, 425/217
[51] Int. Cl............................... B29 3/01, B29 3/12
[58] Field of Search.................... 425/131, 155, 162, 425/145, 215, 216, 217, 132

[56] References Cited
UNITED STATES PATENTS

| | | | |
|---|---|---|---|
| 2,871,516 | 2/1959 | Sherman et al................. | 425/217 X |
| 3,422,648 | 1/1969 | Lemelson................................... | 72/8 |
| 3,502,752 | 3/1970 | Brown............................ | 425/141 X |
| 3,175,247 | 3/1965 | Morrison ........................ | 425/145 X |
| 836,083 | 11/1906 | Bowley ................................. | 264/36 |
| 3,209,402 | 10/1965 | Riley et al........................... | 425/131 |

FOREIGN PATENTS OR APPLICATIONS
354,837 8/1931 Great Britain

*Primary Examiner*—J. Spencer Overholser
*Assistant Examiner*—David S. Safran
*Attorney*—Hofgren, Wegner, Allen, Stellman & McCord

[57] ABSTRACT

A method and apparatus for producing tubing having different characteristics, e.g. physical, chemical and the like, along its axial length including two or more extruders that feed different plastic materials to a mixing and extruding die with a sequencing control for decreasing or interrupting the flow from one extruder and simultaneously increasing the flow from one other extruder and after a predetermined time interval reversing this operation to produce a tube having repeating different characteristics which tube may thereafter be cut into sections including portions containing each characteristic. In one embodiment a composite extrusion is employed with a control for increasing the flow of one plastic to one of the dies and for simultaneously and proportionally decreasing the flow to the other of the dies to produce a tube having gradually changing physical properties along its axial length while maintaining a uniform cross-section tube.

1 Claim, 9 Drawing Figures

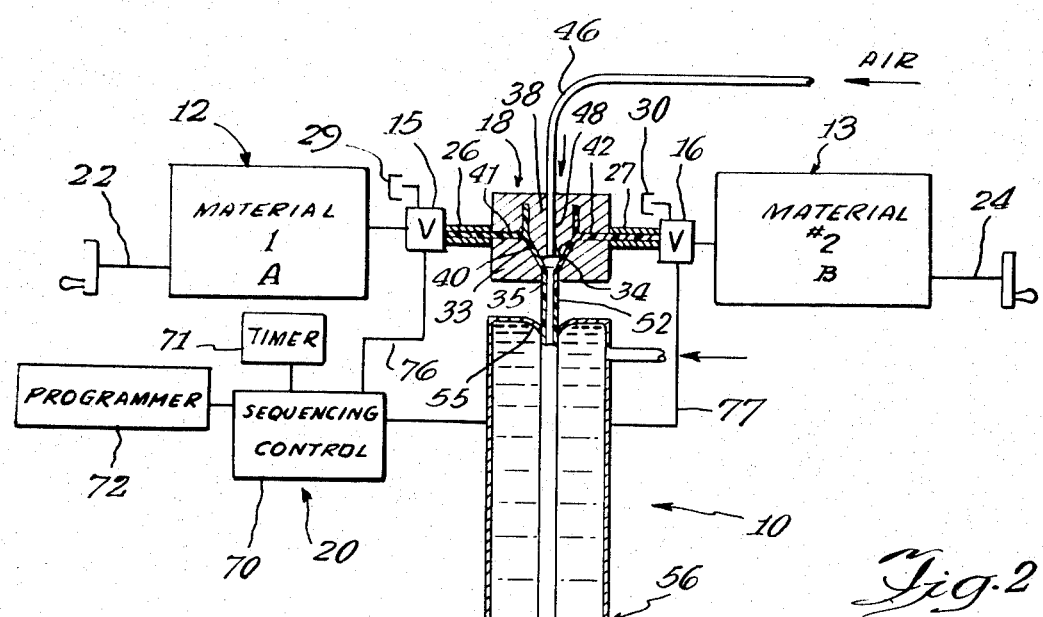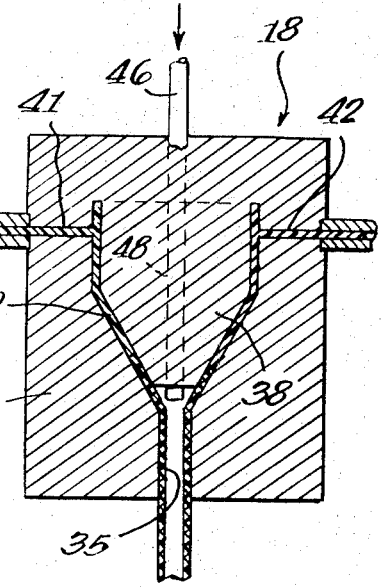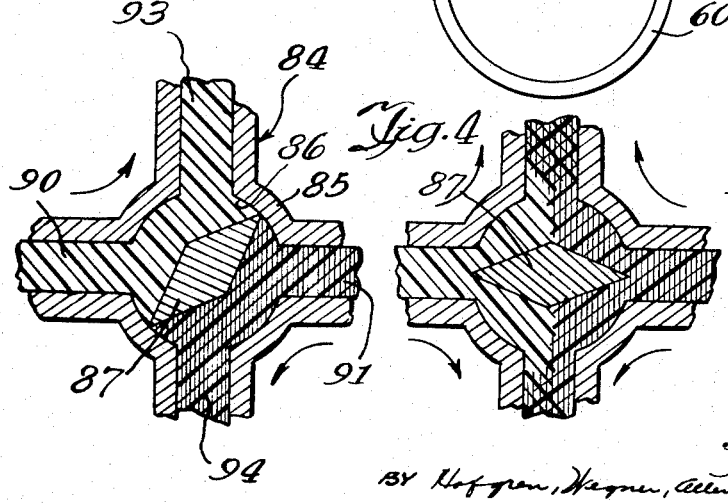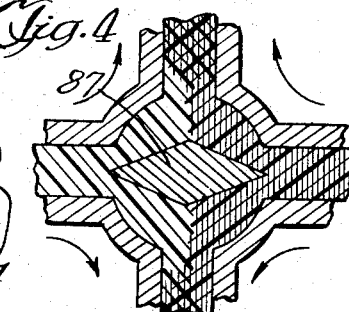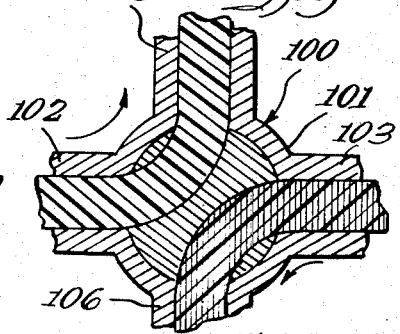

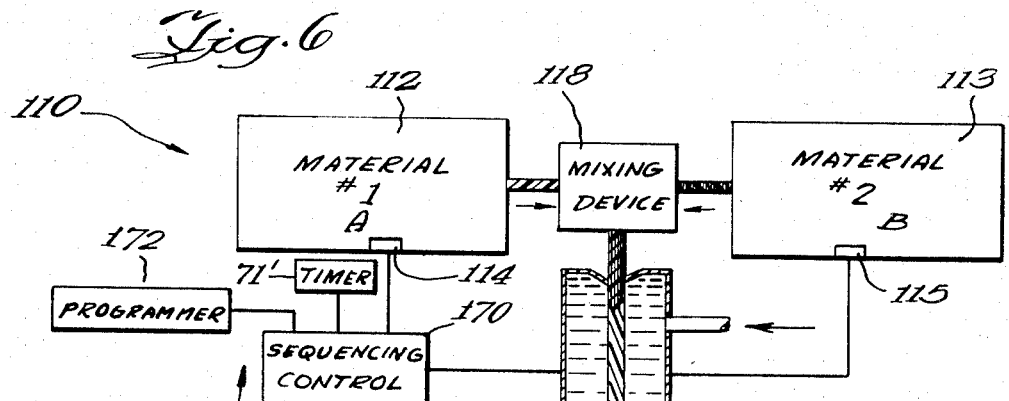
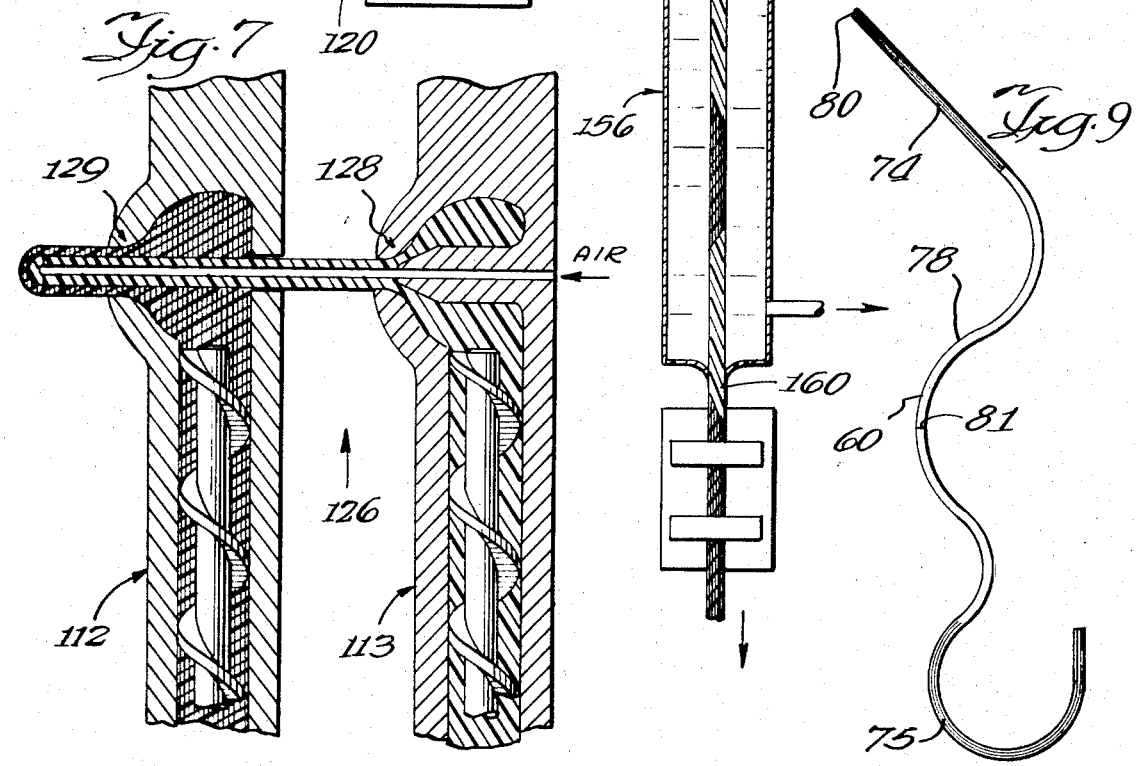
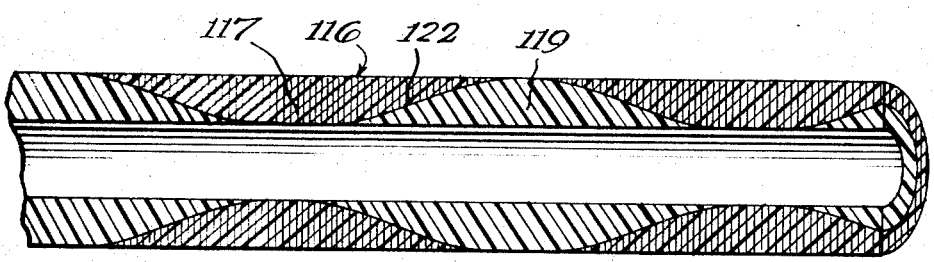

APPARATUS FOR EXTRUDING PRODUCTS OF PLURAL COMPONENTS OF VARIED PROPORTIONS WITH SCRAP RECLAMATION

This is a continuation, of U.S. Pat. application Ser. No. 865,615 filed Oct. 13, 1969 now abandoned.

BACKGROUND OF THE INVENTION

The present invention relates to the manufacture of plastic tubing and more particularly to the extrusion of tubing having different characteristics, such as physical, chemical or the like, along its axial length.

There are many applications, particularly in the biomedical field, where it is desirable to have tubing sections having different characteristics, such as different physical properties, and particularly sections differing in stiffness along the length of the tubing. For example, in constructing tubing for use in artificial kidney connections to the patient, it is desirable to have a tube with a stiff end and a flexible end. One method of constructing such tubing in the past has been to chemically remove the plasticizer from one end of the tube. Another method of making such a tube is to take two separate sections of different plastic tubes and fasten them together employing a suitable joining process. Neither of these methods has been completely satisfactory.

Another tubular product that requires different characteristics along its length and in particular different durometer sections along its length is a Yankauer suction tube set that is presently constructed of a rigid plastic material formed into the Yankauer shape and connected to a piece of tubing that is flexible and contains a conductive line. Moreover, suction catheters that are introduced orally require a soft tip with a stiff body to provide the required degree of insertion and manipulation ease without producing patient trauma in the sensitive internal passageways. Further, trocar catheters are more useful if their distal tips are stiffer than the body of the catheter to facilitate insertion. The prior method of having a rigid tip cemented on the end of a flexible tube for this purpose presents a continuing danger of having an improperly cemented tip come off the flexible tip of the catheter inside the patient.

In many products today change in relative stiffness along the length of the tubing is accomplished by a change in wall thickness. However, the disadvantage in this approach is that it requires a compromise in either the tubing internal diameter or the tubing outside diameter.

There are other examples of tubing that require different stiffnesses in one region than in others. For example, various types of venous-arterial cannulae require a soft portion within the patient's vessel and a relatively stiff portion outside the body for manipulation and durability. This permits the cannula to conform easily with the patient's vessel without abrading the wall thereof and yet be rigid enough where it passes through the tissue and skin to avoid sharp bending of the cannula. Similar characteristics are desirable in an arterial-venous shunt used in hemodialysis. In the present construction of shunts of this type a stiff external tube is connected to soft implanted tubing portions inside the selected vein and artery. During the hemodialysis procedure it is necessary to reconnect these tubes after dialysis and this step has been found to be a major cause for blood clots and shunt failures. Similar principles apply to other tubes such as chest drainage devices, urinary draining devices, feeding tubes and other tubes that require rigid as well as pliable portions where the pliable portions are not necessarily at the ends of the tubes but possibly in the middle regions.

SUMMARY OF THE PRESENT INVENTION

In accordance with the present invention, a method and apparatus are disclosed for constructing plastic tubing having different characteristics along its axial length by extruding a first plastic material through a die and, after a predetermined time interval, decreasing or interrupting the flow of this first plastic material to the die and simultaneously extruding a second plastic material through the die, and thereafter in predetermined sequence alternating these functions so that after appropriately severing the resulting extrudate, tubes will be produced having different characteristics along their axial lengths without variation in cross-sectional dimensions. The term "characteristic" as used hereinabove and hereinafter is intended to include physical characteristics, chemical characteristics, thermal characteristics, and the like. Any relative differences between axial sections of a tube are considered different characteristics.

There are provided at least two extruders, one for homogenizing and delivering a first plastic with a predetermined characteristic to a mixing die, and a second extruder for homogenizing and delivering a second plastic material with a different characteristic to the same mixing die. A sequencing control is provided for, at predetermined time intervals, decreasing the flow from one of the extruders and proportionally increasing the flow from the other extruder. The flow from the extruder may be controlled by one or two valves or alternatively by controlling the screw rotation rate in the individual extruders through the sequencing control.

There is also provided a composite extrusion die which when employed with the present apparatus and method produces a tube having sections of exclusively one plastic and other sections of exclusively another plastic with intermediate sections having inner portions of one plastic and outer portions of the other plastic. This concentric extruding process results in a laminar tube of constant cross-sectional dimensions so that the particular variant characteristics between the two plastics will change within the tube wall in a radially outward direction.

Using the present method and apparatus will produce products that have differeet characteristics along their length such as, for example, one portion that is clear and another axially spaced portion that is opaque, or where one portion is X-ray opaque and another axially spaced portion transmits the X-rays therethrough, or one section is conductive and an adjacent section is non-conductive.

BRIEF DESCRIPTION OF THE DRAWINGS

FIG. 1 is a schematic illustration of an extruding device according to the present invention;

FIG. 2 is a cross-sectional view of the single orifice air supplied extruding die of FIG. 1;

FIGS. 3 and 4 illustrate one form of a mixing valve, in cross-section, that may be employed in place of the two supply valves in FIG. 1;

FIG. 5 is a fragmentary cross-section of another selective delivery valve which may replace the two valves shown in FIG. 1;

FIG. 6 is a modified form of the extruding apparatus of FIG. 1;

FIG. 7 is a fragmentary cross-section of a composite extrusion die arranged to form a uniform cross-section tube;

FIG. 8 is a cross-section of a tube produced by the die of FIG. 7; and

FIG. 9 is a plan view of a tube that may be produced by any of the embodiments illustrated.

DETAILED DESCRIPTION OF THE PREFERRED EMBODIMENTS

Referring to the drawings and particularly FIG. 1, an extruding apparatus 10 is illustrated consisting generally of an extruder 12, a similar extruder 13, control valves 15 and 16, extrusion die 18, and a control circuit 20 for the valves 15 and 16. Extruders 12 and 13 are by themselves conventional screw type extruders which operate to homogenize and deliver materials to die 18. The extruders 12 and 13 have manual speed controls 22 and 24.

Valves 15 and 16 control the flow of materials (for example molten plastics) from the extruders 12 and 13, respectively, to die 18. Valves 15 and 16 are conventional three-way valves which selectively and proportionally deliver the materials to die inlets 26 and 27, respectively, or scrap barrels 29 and 30, respectively.

The use of the two three-way valves 15, 16 permits the total reclamation of scrap from the extruders 12 and 13.

The extruding die 18 shown enlarged in FIG. 2, performs a mixing function for materials flowing through inlets 26 and 27. The die includes a bushing member 33 having a conical diverging bore 34 therein having an opening as at 35 at the periphery of the bushing defining the die orifice. Mounted within the conical bore 34 is a conical pin 38 which defines a passageway 40 communicating with inlets 41 and 42 in bushing 33. For the purpose of extruding tubing, air is supplied through a suitable conduit 46 and a passage 48 in the pin 38 for the purpose of forming the central opening in the extruded tube.

Referring to FIG. 1, extrudate 52 from the die 18 takes a form retaining set as soon as it leaves the die orifice 35 and passes through a flexible seal 55 into the cooling tank 56 where the extrudate 52 cools and solidifies. At the other end of the tank 56 the extrudate 52 is drawn by a take-out device 62 which includes an endless belt 64 and rollers 66 which engage the opposite sides of the cooled extrudate in the form of tubing 60.

The control circuit 20 is provided for timing and programming the flow of molten plastic from the extruders 12 and 13 to the mixing extruding die 18. Toward this end the control circuit is seen to consist of a sequencing control 70, a timer 71 and a programmer 72. The timer 7 is a conventional item and provides a signal to the sequencing control 70 whenever it is desired that a change in flow from the extruders 12 and 13 occur. That is, timer 71 essentially determines the length of the portion of tube 60 that has one characteristic as well as the length of the second portion of the tube that has a second characteristic.

Programmer 72 programs the change in flow rates from the extruders 12 and 13. That is, the programmer 72 can provide either a gradual change from extruder 12 to extruder 13 or it can provide a rapid change as desired. Moreover, the programmer 72 provides signals to the sequencing control 70 to assure the proportional operation of valves 15 and 16. That is, as valve 15 closes at one rate, valve 16 will open at the same rate assuring a constant extrudate flow rate from the die 18 and a constant wall thickness in the resulting tube 60. The programmer 72 can take many forms such as interchangeably rotary cams with a suitable transducer for providing signals to the sequencing control 70.

Te sequencing control 70 merely serves to gate the program signals to the valves 15 and 16 in accordance with cycle initiation by timer 71.

In the operation of the embodiment shown in FIGS. 1 and 2 assume initially that extruder 12 is delivering its maximum volume of molten plastic to die 18 through completely open valve 15 and that extruder 12 contains a plastic having one characteristic such as a high durometer. At the same time, assume that extruder 13 is delivering no molten plastic to the die 18 and that valve 16 diverts molten plastic having a second characteristic such as a relatively low durometer to the scarp barrel 30. Under these conditions the extrudate 52 and the tubing 60 will be solely the high durometer plastic from extruder 12. After a predetermined time interval time 71 emits a signal to the sequencing control 70 indicting a change from the high durometer plastic of extruder 12 to the low durometer plastic of extruder 13. Sequencing control 70 then, through lines 76 and 77, begins closing valve 15 diverting a portion of the plastic from extruder 12 to scrap barrel 29 and proportionally opening valve 16 diverting a portion of the plastic from extruder 13 to the die inlet 27. The sequencing control is this mode operates in response to programmer 72 to control the rate of change from one plastic to the other. After the change from extruder 12 to extruder 13 is complete, programmer 72 will maintain valve 15 in the position diverting all of its molten plastic flow to scrap barrel 29, and valve 16 in an open position directing all of its flow to the inlet 27 of die 18 so that the extrudate 52 and tube 60 will at this point begin a section composed solely of the molten plastic from extruder 13 which results in a flexible section in tube 60. After a predetermined time interval in accordance with the desired length of the flexible portion of the tubing, timer 71 emits a signal to sequencing control 70 which initiates the closure of valve 16 and the opening of valve 15, reversing the tube composition to its original state. Control circuit 20 is thus seen to be repetitive, producing predetermined lengths of stiff and flexible sections in tubing 60.

As seen in FIG. 9, a piece of tubing 60 is illustrated which consists of stiff sections 74 and 75 separated by a soft section 78. In accordance with the present method of producing tube lengths having different characteristics along its length, the tube 60 may be severed as at 80 and 81 to produce a tube having one characteristic, for instance, a stiff section at one end and having a different characteristic, for instance, a relatively flexible section at the other end.

As an alternative to the separate valves 15 and 16 a single mixing valve 84 may be provided (as shown in FIGS. 3 and 4) for controlling the flow from both of the extruders 12 and 13 to the extruding die 18. Only one die inlet is required using this valve. The advantage in using valve 84 is that it automatically proportions the flow between the extruders 12 and 13 and the die 18 to assure a constant volume flow to the die and thus a uniform wall thickness, eliminating this function from the programmer 72 in the two valve arrangement shown in FIG. 1. On the other hand the valve 84 does not permit complete scrap reclamation since it mixes scrap from both of the extruders. The valve 83 is seen to include a housing 85 and a cylindrical valve chamber 86 with a rotary valve member 87 rotatably mounted therein. Valve housing 85 has an inlet 90 adapted to be connected to extruder 12 and an inlet 91 adapted to be connected to extruder 13. A first outlet 93 directs molten plastic to a scrap barrel and a second outlet 94 directs molten plastic to the die 18.

In the position shown in FIG. 3 the movable valve member 87 directs flow from extruder 12 to the scrap barrel and at the same time directs molten plastic from extruder 13 to the die 18 through outlet 94. In the position shown in FIG. 4 the valve member 87 is shown in its central position where it divides the flow from each of the extruders between scrap and the die 18. It may be readily seen that in intermediate positions the valve member 84 will proportion flow between the extruders and the outlet 94 to maintain a substantially constant volume flow to the die 18.

A still further valve 100 is shown in FIG. 5 which may be substituted for valve 84 although it does not have the proportional characteristics of the latter. This latter valve is seen to consist of a housing 101 having inlets 102 and 103 connected respectively to the extruders 12 and 13 and outlets 105 and 106 connected respectively to a scrap barrel and to the inlet of die 18.

In FIG. 6 a modified extruding apparatus 110 is illustrated which is substantially similar in operation to the embodiment illustrated and described with respect to FIG. 1. The primary difference between these constructions is that in the FIG. 6 embodiment no valves 15 and 16 are provided for controlling the flow of molten plastic to the mixing die 118. Instead, the sequencing control 170 of the controls 120 varies proportionately the feed screw speed controls 114 and 115 associated with the extruders 112 and 113 respectively. Thus, in order to reduce flow from one of the extruders the sequencing control 170 reduces the rate of rotation of the associated extruder screw. In this instance the programmer 172 during the transition from a portion or section of tube 160 made from material 1 having one characteristic to a portion or section thereof made from material 2 having a second characteristic, assures that the sum of the speeds of the screws of the extruders 112 and 113 remains constant to maintain a constant flow to the mixing device 118.

In FIG. 7 a composite extrusion die 126 is illustrated which when employed with the apparatus 110 of FIG. 6 can produce a tube 116 illustrated in FIG 8. Tube 116 has sections 117 composed entirely of plastic from extruder 112 and sections 119 composed entirely of plastic from extruder 113 with intermediate sections 122 having one inner radial portion composed of plastic from extruder 113 and an outer radial portion composed of plastic from extruder 112.

The composite die 126 is seen to consist of a first die 128 connected to receive molten plastic from extruder 113 and a coaxial die 129 connected to receive molten plastic from extruder 112. While the dies 128 and 129 are conventional in construction they would normally be employed to produce tubes having inner and outer layers. In contrast to this and when used with the present apparatus die 126 will produce a tube of uniform cross-section (due to differential function of programmer 172) with tube sections consisting almost entirely of extrudate from only one of the dies 128, 129.

In addition to forming tubing having different hardness characteristics along its length, it is within the scope of our disclosure to have tubing made joining various grades of polyvinylchloroide plastic, or polypropylene plastic, or polyethylene plastic, or other miscible plastics. Tubes have been made having different opacities and different X-ray sensitive characteristics, all within the scope of the invention.

It is comtemplated to be within the scope of this invention to use three or more extruders with appropriate valving and controls so as to produce a tube having three or more variations in characteristics along its length, i.e., a stiff material for the tip, a pliable material for the body portion and a less stiff material for the connector end. Other variations are contemplated within the broad context of this disclosure.

We claim:

1. An apparatus for the manufacture of tubing having different characteristics along its length, comprising: a first plastic extruder device for preparing a first plastic having a predetermined characteristic, a second plastic extruder device for preparing a second plastic having a characteristic different from said first plastic, extruding die means for receiving plastic from both of said extruding devices, and control means for increasing the volume flow from one extruder device and for decreasing the volume flow from the other extruder device to vary the characteristics of the resulting tubing along its length, said control means including valve means between the extruder device and the die means, said valve means controlling the volume flow from each of said extruder devices to said die means, said valve means including a first valve between said first extruder device and said die means and a second valve between said second extruder device and said die means, said valve means each having an outlet connectable to scrap collection means to achieve total scrap reclamation, said control means proportionally controlling said first and second valves.

* * * * *